United States Patent [19]
Kinoshita

[11] Patent Number: 5,307,196
[45] Date of Patent: Apr. 26, 1994

[54] OPTICAL RECEIVER

[75] Inventor: Osamu Kinoshita, Kawasaki, Japan

[73] Assignee: Kabushiki Kaisha Toshiba, Kawasaki, Japan

[21] Appl. No.: 887,880

[22] Filed: May 26, 1992

[30] Foreign Application Priority Data

Jun. 5, 1991 [JP] Japan .................. 3-134190

[51] Int. Cl.$^5$ .................................. H04B 10/06
[52] U.S. Cl. .................... 359/189; 359/194;
307/355; 307/360; 307/362; 307/354; 375/76
[58] Field of Search ............... 359/189, 190, 192, 195, 359/194; 375/76; 307/354, 355, 356, 357, 358, 359, 360, 361, 362, 363, 364

[56] References Cited
U.S. PATENT DOCUMENTS

| | | | |
|---|---|---|---|
| 3,757,132 | 9/1973 | Nilsson | 375/76 |
| 4,540,897 | 9/1985 | Takaoka et al. | 375/76 |
| 4,994,692 | 2/1991 | Wolke | 307/354 |
| 5,008,532 | 4/1991 | Ono et al. | 307/360 |
| 5,025,456 | 6/1991 | Ota et al. | 307/358 |
| 5,027,339 | 6/1991 | Yoda et al. | 369/54 |
| 5,214,319 | 5/1993 | Abdi | 307/362 |

FOREIGN PATENT DOCUMENTS 62-154928  7/1987  Japan .
2-266630  10/1990  Japan .
3-7175  1/1991  Japan .

Primary Examiner—Richard E. Chilcot, Jr.
Assistant Examiner—Rafael Barares
Attorney, Agent, or Firm—Oblon, Spivak, McClelland, Maier & Neustadt

[57] ABSTRACT

According to an optical receiver of the present invention, an optical input signal is converted to an electric signal by a photoelectric element, and amplified by an amplifier. Thereafter, a band frequency is restricted by a low pass filter, and a peak value of a bottom level of the band-restricted pulse signal is detected. Then, an offset voltage is added to the detected value, thereby a compare reference value is generated. The output of the amplifier is compared with the compare reference voltage by a comparator, thereby data is discriminated.

6 Claims, 7 Drawing Sheets

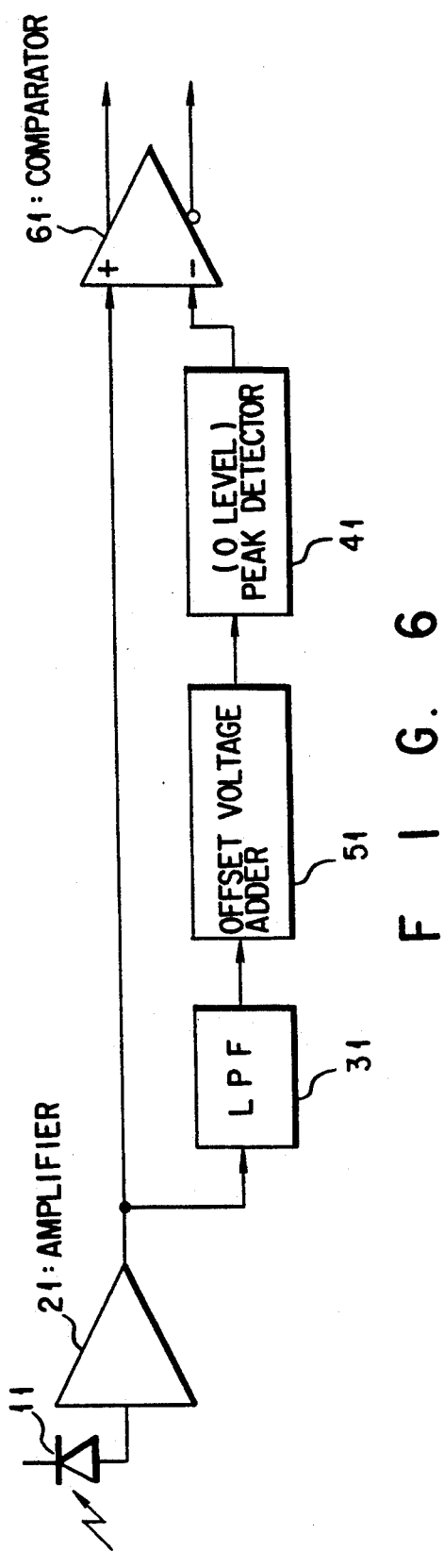
F I G. 6
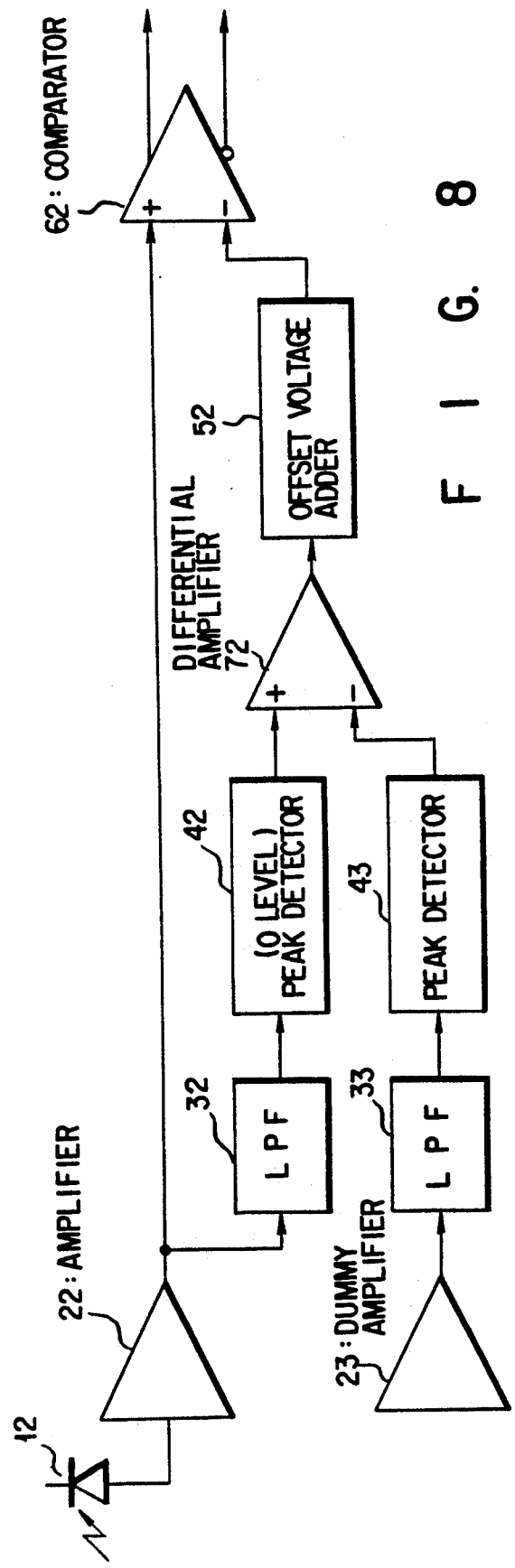
F I G. 8

OPTICAL RECEIVER

BACKGROUND OF THE INVENTION

1. Field of the Invention

The present invention relates to a DC coupling type optical receiver to be used in a data transmitting apparatus for such as a local area network.

2. Description of the Related Art

Generally, in an optical local area network comprising a star network, there is used the so-called burst data transmission in which data is not transmitted when unnecessary and transmitted when necessary in order to efficiently transmit data. The burst data transmission is characterized in that a level of a receiving signal abruptly varies for a short time unlike the general continuous data transmission between two points. In other words, in a case case where a signal having a high level arrives after a long silence period or a case where a signal sent from a transmitting station B, which is located far away a receiving station, arrives right after a signal sent from a transmitting station A, which is located close to the receiving station, the receiving level largely varies by the difference between the station A and the station B in the loss of transmission line.

Such an optical receiver to be used for receiving burst data must be satisfied the following three requirements:

First, time for which the signal can not be received is made extremely short in the case of the abrupt variation of the receiving level.

Second, a receiving dynamic range is wide.

Third, the optical receiver must be stably operated under even environmental variations such as a temperature variation, a power voltage variation, and the like.

In conventional, as a method for satisfying the first requirement, the optical receiver is formed by a DC coupling amplification. According to a method using an AC coupling amplification, which is employed well in general, it takes relatively much time to converge a discrimination level to an average value after the receiving level varies. Due to this, it is difficult to correctly discriminate data for the period of time. In contrast, according to the method using the DC coupling amplification, "0" level of a pulse signal, serving as a reference of the variation of the receiving level, is transmitted to a discrimination level, so that a quick response can be performed.

However, in the method using the DC coupling amplification, influence of drift on an amplifier must be considered. As the optical receiver in which influence of drift on the amplifier is removed, for example, Published Examined Japanese Patent Application 3-7175 discloses a method using a dummy circuit having the same circuit constant. The disclosed optical receiver uses a method of a fixed threshold value in which an output of the dummy amplification circuit is partially pressurized and a discrimination threshold value of data is set. Due to this, there is a problem in that the variation of the pulse width of discriminated data increases in accordance with the variation of the receiving level.

Moreover, in addition to the static variation such as a temperature drift, the amplifier has a dynamic variation characteristic in which the operation point varies depending on the value of the receiving level. The dynamic variation depending on the value of the receiving level cannot be detected by the dummy circuit. Due to this, it is required that the discrimination threshold value of data be set higher in consideration of the dynamic variation. However, if the threshold value is set to be higher, there occurs new problems in which the minimum receiving level is deteriorated and a wide receiving dynamic range cannot be obtained.

In order to solve the above problems, for example, Published Unexamined Japanese Patent Application No. 62-154928 discloses a method for varying the threshold value in accordance with the change of the receiving level. According to this method, a peak value of the receiving signal is detected and the discrimination threshold value is varied. Also, the drift of the amplifier is removed by the dummy circuit. Other than the above method, there is a method in which the change of the discrimination threshold value and the removal of drift are carried out by a positive and negative peak detector.

FIG. 1 is a block diagram showing the structure of the DC coupling type optical receiver using the positive and negative peak detector. In this drawing, reference numeral 100 is a photodiode for converting an optical signal to an electric signal. An output current of the photodiode of the photodiode 100 is supplied to an amplifier 200. The amplifier 200 amplifies the output current of the photodiode 100 and converts the output current to a voltage signal. The voltage signal is supplied to first and second peak detectors 400 and 800, and an input terminal (+) of a comparator 600. The first peak detector 400 detects the peak value of "0" level side of data from an input signal. The second peak detector 800 detects the peak value of "1" level side of data from an input signal. Each detection voltage is synthesized via partial pressure resistors RD1 and RD2, and supplied to an offset voltage adder 500.

The offset voltage adder 500 adds an offset voltage set in advance into an input voltage, so that the output of the comparator 600 for a silent signal input time is fixed to "0." The added voltage is supplied to an input terminal (−) of the comparator 600 as a compare reference voltage. The comparator 600 compares the voltage signal, which is sent from the amplifier 200 and supplied to the input terminal (+), with the compare reference voltage to be sent to the input terminal (−), and discriminates between receiving data "0" and receiving data "1."

FIG. 2 shows an operation waveform of FIG. 1. In FIG. 2, (f) is an output voltage waveform of the amplifier 200, (g): a waveform of the compare reference voltage; and (h) is a waveform of the output voltage of the comparator 600. VGA is an offset voltage level.

It is assumed that a signal sent from a transmitting station B, which is located far away a receiving station, arrives right after a signal sent from a transmitting station A, which is located close to the receiving station, and the receiving level largely varies by the difference between the station A and the station B in the loss of transmission line. The second peak detector 800 detects the peak value of "1" level side of receiving data. Due to this, if the receiving level changes the peak voltage can be obtained in accordance with the change of the receiving level.

On the other hand, the first peak detector 400 detects the peak value of "0" level side of receiving data. Due to this, the voltage corresponding to the DC operation point of the amplifier 200 is detected and output regardless of the change of the receiving level. Therefore, a voltage corresponding to an amplitude value of receiving data is generated between the output of the first peak detector 400 and that of the second peak detector 800. Then, a signal, which the above generated voltage is divided by resistors RD1 and RD2, and the offset voltage VGA are added, and the added result is used as the compare reference voltage (g).

As shown in the drawing, the compare reference voltage (g) changes in accordance with the size of of the receiving level, and the discrimination is performed at substantially ½ level of amplitude level of receiving data by the comparator 600 in a case where resistors RD1 and RD2 are equal to each other. The variation (drift) of the operating point of the amplifier 200 due to the temperature change is detected by the peak detector 400, and the amplifier 200 operates such that the compare reference voltage is varied in the same direction by an amount, which is equivalent to drift. The comparator 600 amplifies the difference between the positive and negative inputs and operates to remove the change of in-phase voltage. Due to this, influence of drift is removed and the stable discrimination can be performed.

The conventional optical receiver disclosed in Published Unexamined Japanese Patent Application No. 62-154928 or shown by FIG. 1 can realize a good burst receiving characteristic by drift compensation and control of the discrimination threshold value. However, there is a disadvantage in that the circuit structure becomes complicated, that is, a threshold voltage selection circuit having a relatively complicated structure is needed or positive and negative peak detectors are required.

SUMMARY OF THE INVENTION

As mentioned above, the conventional optical receiver can realize a good burst receiving characteristic by drift compensation and control of the discrimination threshold value. However, there is a problem in that the circuit structure becomes complicated, that is, the threshold voltage selection circuit having the relatively complicated structure is needed or positive and negative peak detectors are required.

The present invention has been made in order to solve the above problem. An object of the present invention is to provide a DC coupling type optical receiver which can realize a good drift compensation and control of a discrimination threshold value by a simple structure.

According to the present invention, there is provided an optical receiver, which discriminates data by amplifying an output of a photoelectric transfer element in a DC coupling manner and compares the output with a compare reference value, comprising an amplifier amplifying the output of said photoelectric transfer element and a filter restricting a frequency band of the output signal of the amplifier, compare reference value generating means for detecting a peak value of an output bottom level of said filter and generating said compare reference value based on said detected value, and a comparator comparing the compare reference value obtained by said compare reference value generating means with the output signal of said amplifier.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a block diagram showing the basic structure of the other embodiment of the present invention;

FIG. 8 is a circuit diagram showing the basic structure of the other embodiment of the present invention.

DETAILED DESCRIPTION OF THE PREFERRED EMBODIMENTS

One embodiment of the present invention will be explained with reference to FIGS. 3 to 5.

Figure 1:
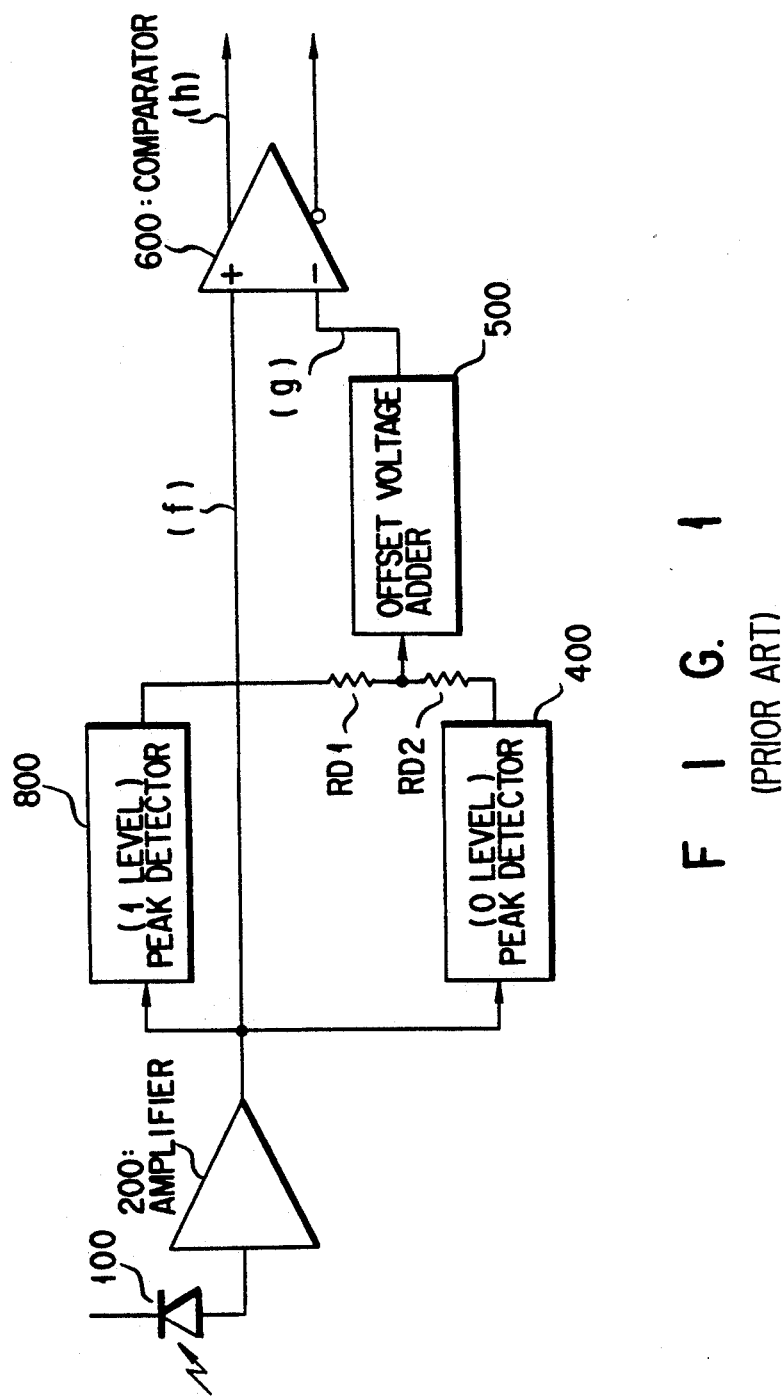
FIG. 1 is a block diagram showing the structure of a conventional DC coupling type optical receiver.
Figure 2:
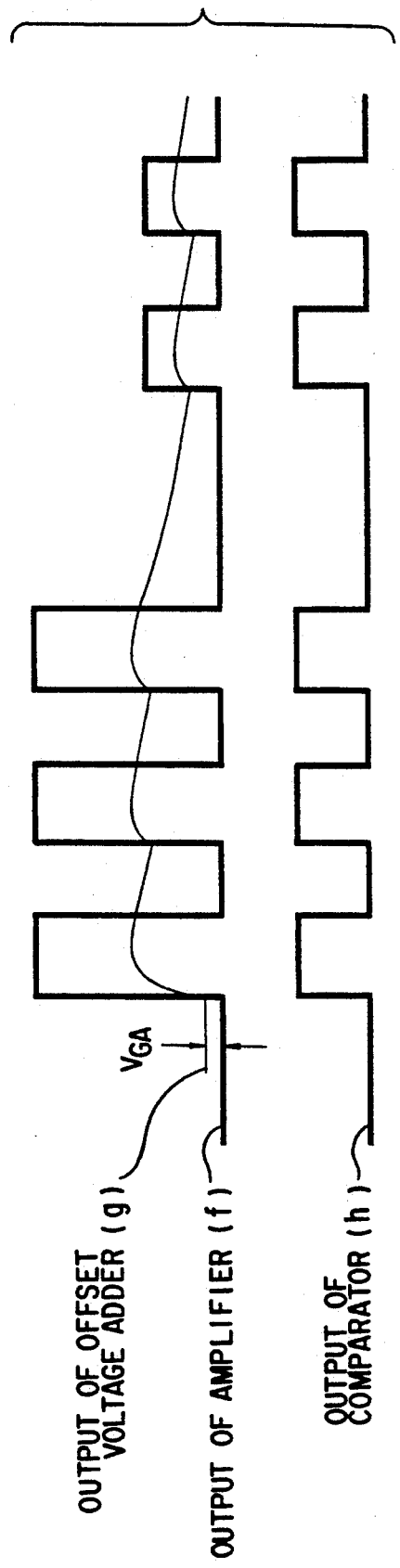
FIG. 2 is a view showing a waveform explaining the operation of the optical receiver of FIG. 1.
Figure 3:
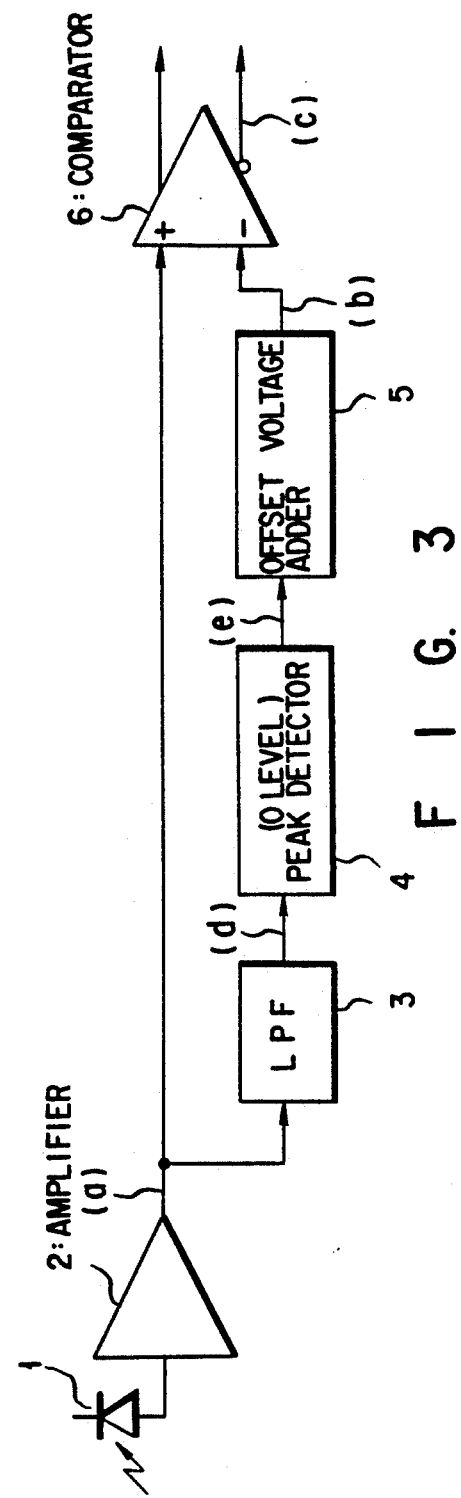
FIG. 3 is a block diagram showing the basic structure of the optical receiver according to an embodiment of the present invention.

FIG. 3 shows the basic structure of the embodiment. Reference numeral 1 is a photodiode, 2: an amplifier; 3: a low pass filter; 4: a peak detector; 5: an offset voltage adder; and reference numeral 6 is a comparator.

First, an optical input signal is converted to an electric signal by the photodiode 1 and is amplified by the amplifier 2. The amplifier 2 is, for example, a parallel feedback type reverse amplifier, which converts the optical input signal to the electric signal having a negative polarity. The output signal of the amplifier 2 is divided into two. One is supplied to the input terminal (+) of the comparator 6, and the other is supplied to the low pass filter 3.

The low pass filter 3 sets, for example, a cut-off frequency to be less than a maximum repetition frequency of input data, and restricts a frequency band of a pulse signal, which is output from the amplifier 2. The peak detector 4 detects a peak value of a bottom level of the pulse signal, which is band-restricted by the low pass filter 3, and the output value is input to the offset voltage adder 5.

The offset voltage adder 5 adds an offset voltage VG, which is used to fix a discrimination signal at the time of a silent signal to "0", to the output of the peak detector 4, and outputs the added voltage. The added voltage is supplied to the input terminal (−) of the comparator 6. The comparator 6 compares the output of the offset voltage adder 5 with that of the amplifier 2 as a compare reference voltage. In this case, discrimination data is fetched from the reverse output terminal of the comparator 6 in order to return the polarity reversed by the amplifier 2 to the original polarity.

Figure 4:
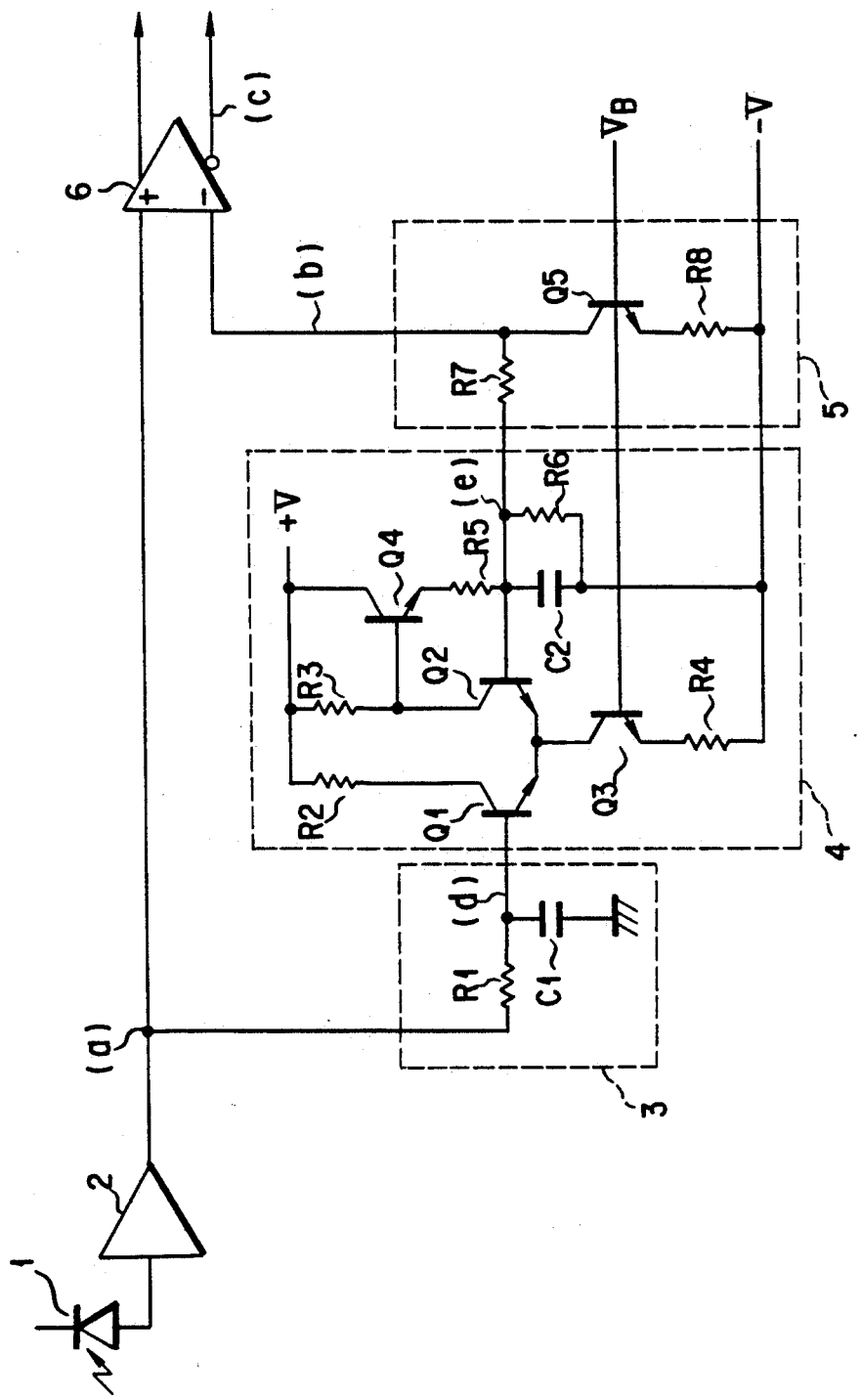
FIG. 4 is a circuit diagram showing the specific circuit structure of the embodiment of FIG. 3.

FIG. 4 is a circuit diagram showing the specific circuit structure of the optical receiver of FIG. 3. FIG. 5 is a view showing a waveform of the operation waveform of the optical receiver of FIG. 4.

In FIG. 4, since the amplifier 2 is the reverse amplifier, the output signal is a signal having a negative polarity. The signal is supplied to the peak detector 4 via the low pass filter 3 comprising a resistor R1 and a capacitor C1.

The peak detector 4 has the feedback structure. The output of the low pass filter 3 is applied to the positive polar input terminal of a differential amplifying circuit comprising transistors Q1 to Q3 and resistors R2 to R4, and a terminal voltage of a peak detection capacitor C2 is fed back to the negative polar input terminal (base of Q2).

Here, Q4 is a switching transistor for positively charging the capacitor C2. If the signal is input to the peak detector 4 and the base potential of Q1 is higher than that of the capacitor C2, the transistor Q4 is conducted and the capacitor C2 is charged. Since the potential of the capacitor C2 is fed back to the base of the transistor Q2, a differential voltage between the base potential of the transistor Q1 and the potential of the capacitor C2 is generated in a collector of the transistor Q2. Since the transistor Q4 is driven by the differential voltage, the capacitor Q2 is continued charging until the potential of the capacitor C2 is substantially equal to the base potential of the transistor Q1.

If the input signal changes and the base potential of the transistor Q1 is lower than the potential of the capacitor C2, the portion between the base and emitter of the transistor Q4 is reverse-biased and is in a cutoff state, and the transistor Q4 has no influence on the potential of the capacitor C2. At this time, the electrical charge charged in the capacitor C2 is discharged through loads (R6, R7 and the like). However, if a discharge time constant is increased, a positive value, which has the waveform of the voltage applied to the base of the transistor Q1, is maintained in the capacitor C2.

The resistor R5 serves to control the charge time constant to the capacitor C2, and the resistor R6 serves to control the discharge time constant.

As mentioned above, at the time of inputting the signal to the peak detector 4, the signal, which is band-restricted to be less than the maximum repetition frequency of data by the low pass filter 3, is applied. The band-restricted signal forms a triangular waveform in which data portion is attenuated toward the central direction of amplitude. Therefore, as shown in FIG. 5 (d), data "0" level has a waveform rising toward "1" level side (negative direction) by Vd from "0" level. The output waveform of the upper end of the above waveform is peak-detected by the peak detector 4 is shown in FIG. 5 (e). The output voltage is applied to the offset voltage adder 5.

The offset voltage adder 5 comprises transistor Q5, and resistors R7 and R8. The output signal of the peak detector 4 is shifted in the negative direction by the voltage VG, which is determined by the product between a corrector current of the transistor Q5 and the resistor R7. The resistor R8 sets the corrector current of the transistor Q5.

The output of the offset voltage adder 5 changes in accordance with the rising of "0" level due to the band-restriction of the low pass filter 3. Since the value of the rising is proportional to the receiving level, the compare reference voltage applied to the comparator 6 moves to the central direction of amplitude in accordance with the receiving level as shown in FIG. 5 (b). Due to this, the comparator 6 performs the stable discrimination in accordance to the change of the receiving level.

On the other hand, regarding the operation point variation of the amplifier 2 generated by the temperature change, the changing speed is extremely slow, and no attenuation due to the low pass filter 3 is subjected to the operation point variation. Therefore, the operation point variation can be correctly detected by the peak detector 4. The compare reference voltage faithfully follows the operation point variation of the amplifier 2, and the influence of the operation point variation is removed by the in-phase removing function.

Therefore, the above-structured optical receiver can realize the control of the discrimination threshold value by the low pass filter 3 and only one polarity peak detector 4 in place of the conventional peak detector having bipolarity. Therefore, the circuit structure can be simplified. Moreover, since the peak detector of the feedback type is used, the large gain of the differential amplifying circuit can be obtained, thereby the temperature characteristic of the switching transistor Q4 the charging difference to the peak detection capacitor C2 can be sufficiently suppressed by the effect of the negative feedback. In other words, since the peak detector can control drift, which the peak detector generates itself, to be extremely small, the peak detector can precisely detect drift, which is generated by the amplifier 2, and the drift can be removed by the comparator 6.

According to the above-structured optical receiver, since the cut-off frequency of the low pass filter 3, the charge time constant of the peak detector 4, the discharge time constant have influence on the burst data receiving, the parameter setting is important. The cutoff frequency of the low pass filter relates to the size of the discrimination threshold value, and the charge and discharge time constants of the peak detector 4 relate to the follow speed of the threshold voltage.

Figure 5:
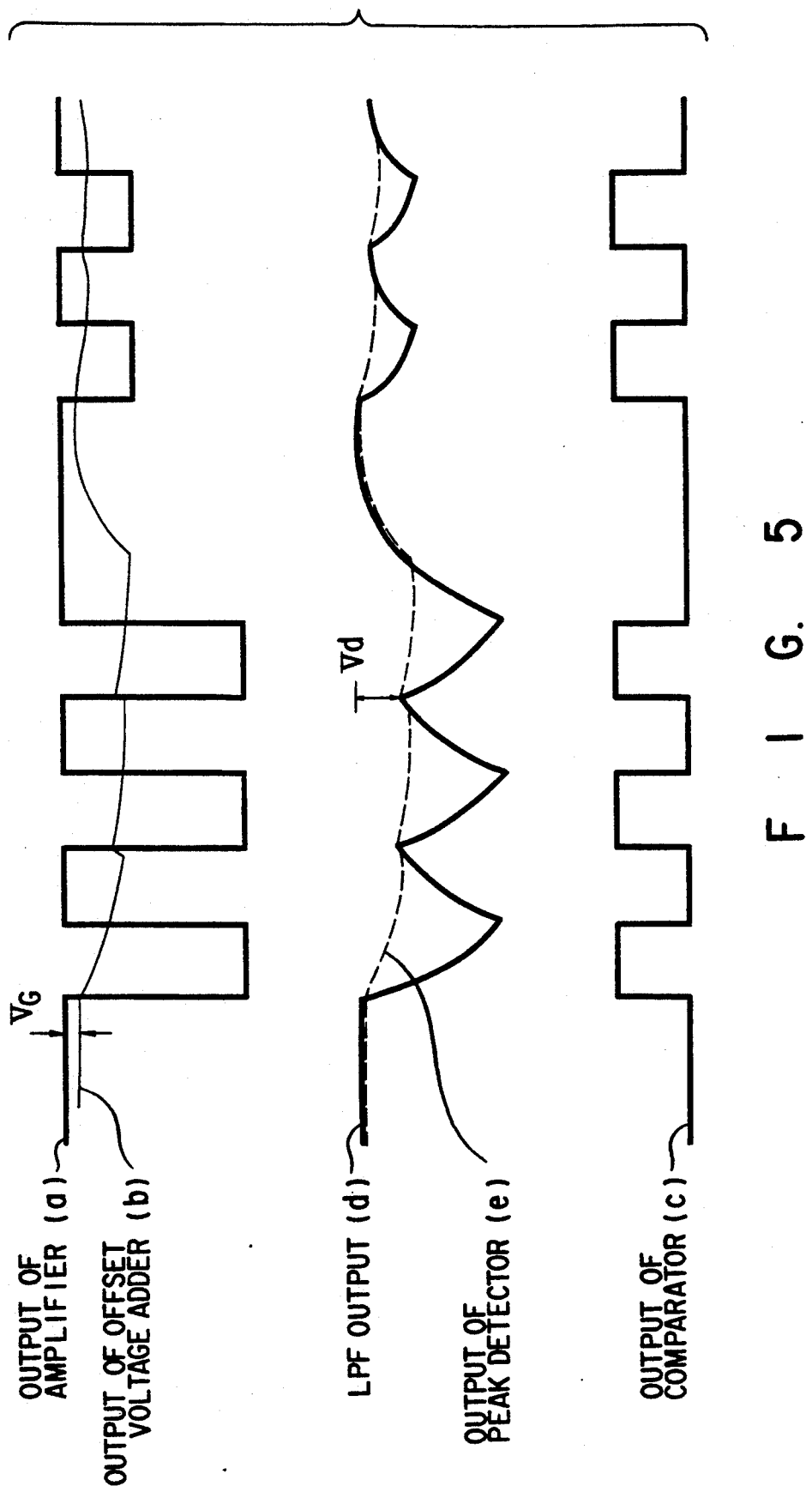
FIG. 5 is a view showing a waveform explaining the operation of the circuit of FIG. 4.

For example, if a cut-off frequency fc of the low pass filter 3 of FIG. 4 is set to be lower than a modulation speed f0 of transmitting data, the value of Vd shown in FIG. 5 increases. The value of Vd is saturated when the modulation speed f0 is about 0.03, and is substantially equal to the mean value of the output value of the amplifier 2. If the cut-off frequency fc is set to be higher than the modulation speed f0, the value of Vd decreases, and the value of VD becomes substantially zero when the modulation speed f0 is about 3 in the case where the frequency band of the transmission path and that of the amplifier are sufficiently wide.

Moreover, the charge time constant of the peak detector 4 relates to the follow speed of the compare reference voltage in the case where Vd changes from low to high in accordance with the change of the receiving level. Also, the discharge time constant relates to the follow speed of the compare reference voltage in the case where Vd changes from high to low. In other words, the charge and discharge time constants are the factors determining the length of "signal non-receiving time" which occurs by the abrupt change of the receiving level.

In order to shorten the length of "signal non-receiving time", the charge and discharge time constants of the peak detector may be set to be small. In addition, the changing width of Vd itself must be controlled to be small, that is, the cut-off frequency must be set to be higher. However, the point that the changing width of Vd is controlled to be small becomes similar to the operation of the conventional fixed threshold value type optical receiver. Due to this, it is necessary to determine the charge and discharge time constants by trade-off between the value of the pulse width variation of data after discrimination and the value of the increase of jitter of the clock reproduced from discrimination data.

To sum up, according to the above-structured optical receiver, the gain of the amplifier 2, the cutoff frequency of the low pass filter 3, the charge and discharge time constants of the peak detector 4, and the adding voltage value of the offset voltage adder 5 can be set so as to meet the requirement of the system to be applied.

In the conventional optical receiver, there is the optical receiver in which the low pass filter is inserted into the front stage of the comparator is called waveform equalization. The waveform equalization is that the receiving frequency band is restricted in the range that no intersymbol is generated, thereby noise quantity is reduced, discrimination S/N is increased (receiving sensitivity is improved). Then, a total frequency band, which includes the frequency band of each of the transmitter, the transmitting path, and the receiving amplifier, and the characteristic of the low pass filter, must be set to be 0.5 f0 or more (sampling theorem).

In contrast, in the optical receiver structured as shown in FIGS. 3 and 4 positively uses intersymbol interference in order to the threshold voltage corresponding to the change of the receiving level. Due to this, there is no problem in that the total frequency band is set to be 0. 5 f0 or less. Moreover, the function of waveform equalization may be provided even in the the optical receiver structured as shown in FIG. 3. In this case, the low pass filter for waveform equalization is formed between the output terminal of the amplifier 2 and the input terminal (+) of the comparator 6.

FIG. 6 is a block diagram showing the other embodiment according to the present invention. In FIG. 6, reference numeral 21 is an amplifier, 31: a low pass filter, 41: a peak detector, 51: an offset voltage adder, and 61 is a comparator. The inserting position of the offset voltage adder 51 is different from that of FIG. 3. In other words, the offset voltage is added to the the output of the low pass filter 31, and the output is peak-detected so that the compare reference voltage can be obtained.

Figure 7:
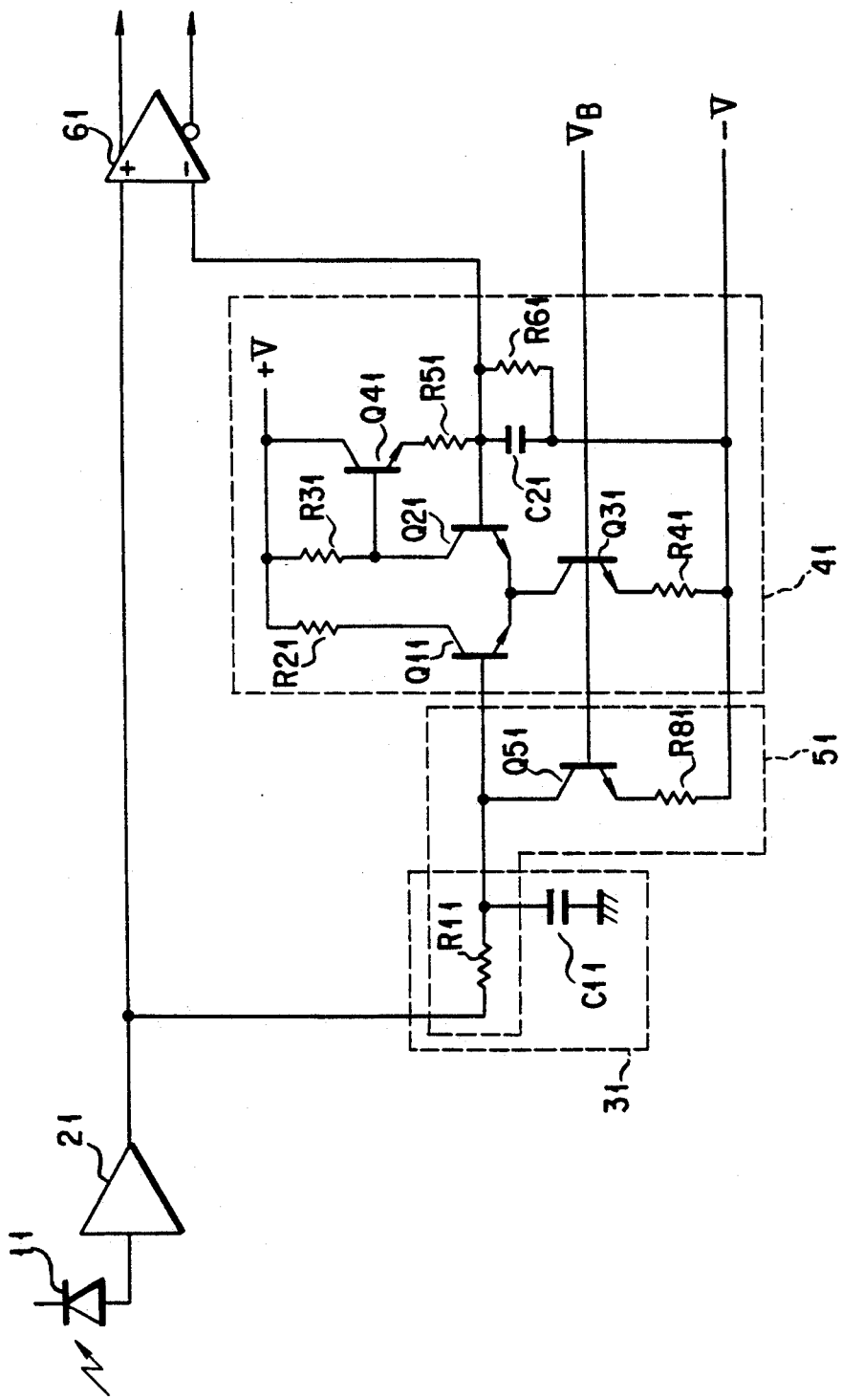
FIG. 7 is a circuit diagram showing the specific circuit structure of the embodiment of FIG. 6.

FIG. 7 is a circuit diagram showing the specific circuit structure of the embodiment of FIG. 6. In FIG. 7, a resistor R11 and a capacitor C11 form the low pass filter 31, and resistors R11 and R81, a transistor Q51 form the offset voltage adder 51.

The resistor R11 serves as both resistor for the low pass filter 31 and resistor for the offset voltage generation, and the offset voltage is generated by that a corrector current of the transistor Q51 passes through the resistor R11. The transistor Q51 and the resistor R81 form a constant current source. Impedance, appearing when viewing from a connect point between the resistor R11 and the capacitor C11 to the collector side of the transistor Q51, is extremely high, and has no influence on the characteristic of the low pass filter 31.

As mentioned above, the merit of the structure in which the offset voltage adder 51 is arranged after the low pass filter 31 lies in that the load of the peak detector 41 is reduced, and the discharge time constant of the peak detection can be increased. Particularly, this is suitable for the case in which data transmission speed is low or the case in which the value of the peak detection capacitor is controlled to be small and the small-size capacitor is used.

FIG. 8 is a block diagram showing the other embodiment of the present invention. In FIG. 8, reference numeral 22 is an amplifier, 32: a first low pass filter, 42: a first peak detector, 72: a differential amplifier, 52: an offset voltage adder, 62: a comparator, 23: a dummy amplifier having the same circuit constant as the amplifier 22, 33: a second low pass filter having the same circuit constant as the low pass filter 32, and 42 is a second peak detector having the same circuit constant as the peak detector 42.

In other words, FIG. 8 shows the structure in consideration of an integrated circuit. The operation point variation of the amplifier 22 and the temperature characteristic of the peak detector 42 are detected by the dummy circuits 23, 33, and 43 each having the same circuit constant, and removed by the differential amplifier 72.

Figure 9:
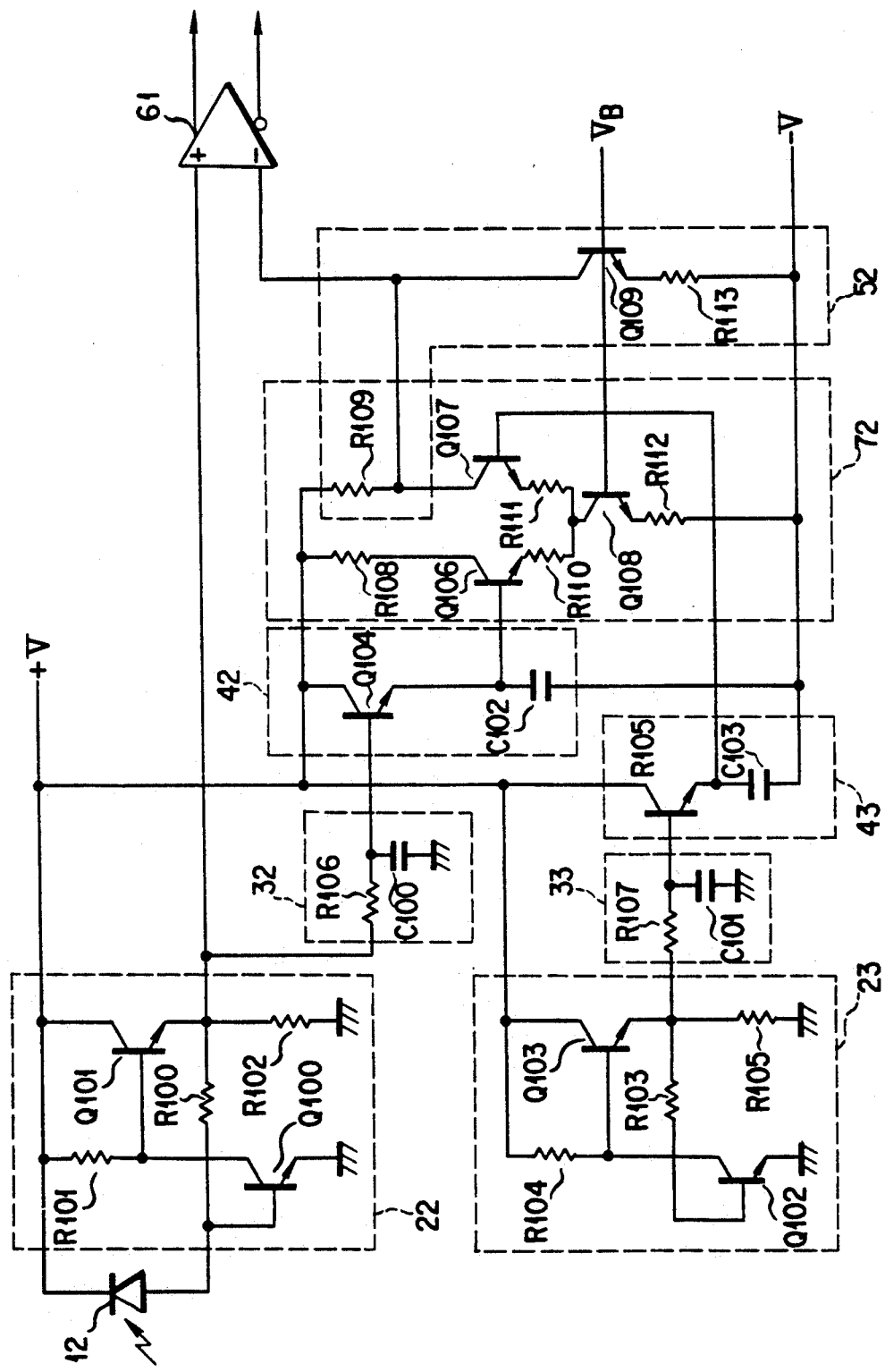
FIG. 9 is a circuit diagram showing the specific circuit structure of the embodiment of FIG. 8.

FIG. 9 shows the specific circuit structure of the embodiment of FIG. 8. In FIG. 9, the parallel feedback type reverse amplifier 22 comprises transistors Q100 and Q101 and resistors R100 to R102. The dummy amplifier 23 comprises transistors Q102 and Q103 and resistors R103 to R105. The peak detector 42 comprises a transistor Q104 and a capacitor C102. Unlike the feedback type peak detector 4, the peak detector 42 is simply formed of an NPN transistor single stage.

The differential amplifier 72 comprises transistors Q106 to 108 and resistors R108 to R112. The differential amplifier 72 sets the gain to be substantially 1, and drift, which is generated in the course from the input of the amplifier 22 to the output of the peak detector 42, is detected by the dummy circuits 23, 33, and 43, and removed. The offset voltage adder 52 comprises resistors R109 and R113, and a transistor Q109.

The resistor R109 serves as both the output resistor (collector resistance of the transistor Q107) of the differential amplifier 72 and the resistor for the offset voltage generation. That is, the offset voltage is generated in the resistor R109 by that a corrector current of the transistor Q109 passes through the resistor R109.

As mentioned above, since the optical receiver of the present invention comprises either a positive or negative peak detector, there are technical advantages in which the circuit structure can be simply made as compared with the conventional optical receiver using a bipolar peak detector and the optical receiver, which is suitable for the high speed data receiving, can be realized.

More specifically, in generally, the NPN transistor is used for the positive peak detection and the PNP transistor is used for the negative peak detection. In the IC manufacturing process at present, the operation speed of the PNP transistor is slower than that of the NPN transistor. Then, if the data transmission speed becomes higher, for example, several tens Mb/s or more, the negative peak detector does not work.

In contrast, according to the optical receiver of the present invention, the peak detector can be formed of only the NPN transistor suitable for the high speed operation, so that the optical receiver, which can be applied to the high speed data transmission area of several tens Mb/s or more, can be realized.

Moreover, according to the optical receiver of the present invention, the output signal of the amplifier is band-restricted. Also, the change of the bottom level of the restricted signal is detected, and the discrimination threshold value is controlled. Thereby, the static drift of the amplifier, which is generated by the temperature change and the power source voltage variation, can be eliminated. In addition, the influence of the dynamic drift, which is caused by the change of the receiving level, can be removed. Thereby, the receiving dynamic range can be expanded.

The present invention is not limited to the above embodiments, and various modifications can be, of course, made without departing from the scope of the invention.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical receiver for receiving a pulse waveform output signal from a photoelectric conversion element which has an optical pulse signal input said optical receiver comprising:

an amplifier for amplifying the output of said photoelectric conversion element and generating an amplified output signal;

a filter for receiving said amplified output signal and for restricting a frequency band of the amplified output signal;

a peak detector for receiving an output signal from said filter and for detecting a peak variation in an output bottom level of said filter;

a comparator for receiving a peak detection signal from said peak detector, said comparator receiving said amplified output signal, comparing said amplified output signal with the peak detection signal, and outputting a binary signal representing results of the comparison; and non-signal compensating means for causing said peak detection signal to have an offset voltage, thereby preventing said peak detection signal from becoming equal in voltage to said amplified output signal when the output signal from said photoelectric conversion element is at a zero level.

2. The optical receiver according to claim 1, wherein said non-signal compensating means adds the offset voltage to said peak detection signal and supplies a resultant signal to said comparator.

3. The optical receiver according to claim 1, wherein said non-signal compensating means adds the offset voltage to the output signal from said filter and supplies a resultant signal to said peak detector.

4. The optical receiver according to claim 1, wherein said peak detector is a feedback type.

5. An optical receiver, which discriminates data by amplifying an output of a photoelectric transfer element in a DC coupling manner and compares the output with a compare reference value, comprising:

a first amplifier amplifying the output of said photoelectric transfer element;

a first filter restricting a frequency band of the output signal of said first amplifier;

a first peak detector detecting a peak value of an output bottom level of said first filter;

a dummy amplifier having the same circuit constant as said first amplifier;

a second filter restricting having the same circuit constant as said first filter, and restricting the output frequency band of said dummy amplifier;

a second peak detector having the same circuit constant as said first peak detector, and detecting a peak value of the bottom level of said second filter;

a differential amplifier extracting a difference between the output of said first peak detector and that of said second peak detector, and amplifying an output;

an offset voltage adder adding a predetermined d.c. voltage to the output of said differential amplifier, and generating said compare reference value; and a comparator comparing the output signal of said first amplifier with the output signal of said offset voltage adder.

6. The optical receiver according to claim 5, wherein said first and second peak detectors are feedback type.

* * * * *